United States Patent [19]

Kalbas

[11] 4,146,932

[45] Apr. 3, 1979

[54] BATHING CAP

[76] Inventor: Berthold Kalbas, Hollgehau 52, 8908 Krumbach, Fed. Rep. of Germany

[21] Appl. No.: 786,367

[22] Filed: Apr. 11, 1977

[30] Foreign Application Priority Data

Apr. 15, 1976 [DE] Fed. Rep. of Germany ....... 2616882

[51] Int. Cl.² .............................................. A42B 1/12
[52] U.S. Cl. ...................................................... 2/68
[58] Field of Search ...................... 2/68; 264/45.1, 45.6

[56] References Cited

U.S. PATENT DOCUMENTS

| 2,908,943 | 10/1959 | Miller | 264/46.6 |
| 3,503,076 | 3/1970 | Marks | 2/68 |

Primary Examiner—Werner H. Schroeder
Assistant Examiner—Doris L. Troutman
Attorney, Agent, or Firm—Michael J. Striker

[57] ABSTRACT

A bathing cap has a body part substantially of a polyurethane foam material. The material includes a polyalcohol component, such as polyester polyol. Chain molecules of the material are cross-linked. Surface layers of the bathing cap have closed cells. The outer face surface is provided with structured formations formed as portions with a thickness other than the thickness of the remainder of the article. The body part of the cap has a thickness less than 1 mm. A method of manufacturing the bathing cap includes supplying components of the material and mixing the same so as to form a predetermined quantity of the polyurethane foam mixture, admitting said mixture into the deepest portion of a form member and inserting into the latter an insert member so as to form a space therebetween for forming the bathing cap and a gap for flowing out a surplus material, forming the bathing cap in the above space and subsequently separating the surplus material from the main part, that is from the bathing cap itself. The method may include heating of the above members, and adding a solvent substance to the components of the material so as to improve distribution of the material during forming the bathing cap.

6 Claims, 2 Drawing Figures

BATHING CAP

BACKGROUND OF THE INVENTION

The present invention relates to a bathing cap, and to a method and an arrangement for manufacturing the same. More particularly, the present invention relates to a bathing cap, and to a method and an arrangement for manufacture of such bathing cap which closely and elastically fits the head of a user.

Bathing caps have been already proposed comprising body parts of a vulcanized caoutchouc or latex. The above caps have a sufficient elasticity so as to be adjusted to the head of the user and to sealingly engage the head without applying undesirable pressure to the head. Such caps are also watertight, and maintain their form over substantial periods of time. However, the prior caps have the disadvantages that under the action of heat they crack or harden and become embrittled; also, their material turns yellow. On the other hand, the method of manufacture of such caps requires great expenditures for equipment, for performing the process of manufacturing, for essentially expensive raw materials, and therefore is very expensive.

One proposed method includes manufacturing a bathing cap of one-piece by means of a pressure or injection operation. In this case the elastomeric material is placed into a mold, and vulcanization is carried out for forming the cap. Another proposed method includes manufacturing a bathing cap by forming separate pieces with apertures therebetween and subsequently punching out the pieces, connecting them with each other and vulcanizing the same. It has been also proposed to manufacture bathing caps by a latex dipping operation.

The caps manufactured by all the above operations possess the above-mentioned disadvantages.

SUMMARY OF THE INVENTION

Accordingly, it is an object of the present invention to provide a bathing cap which avoids the above-mentioned disadvantages of the prior art.

More particularly, it is an object of the present invention to provide a bathing cap which, while avoiding the disadvantages of the prior art, has the desirable characteristics of the known bathing caps and at the same time is less expensive to make than the latter.

Another object of the present invention is to provide a bathing cap which is made of a less expensive material than those of the known bathing caps.

Still another object of the present invention is to provide such a method of manufacture of a bathing cap which is less time-consuming, labor-consuming, energy-consuming, and does not require expensive equipment, and therefore is less expensive than the known methods; and also to provide an arrangement for performing such method.

An additional object of the present invention is to provide a bathing cap which maintain its characteristics, and particularly its form, under the action of stronger deleterious factors and during the greater period of time as compared with the known caps, such as, for instance under the action of a higher temperature or a more intensive light.

In keeping with these objects, and with others which will become apparent hereinafter, one feature of the present invention is that the bathing cap of the invention has a body part substantially of a polyurethane foam material. Such material may include a polyalcohol component, such as for instance polyester polyol. Chain molecules of the material are cross-linked, and the bathing cap has a thickness less than 1 mm. The outer face surface of the bathing cap is provided with structured formations formed as portions of the cap having a thickness different from the thickness of the remainder of the cap.

The solution according to the invention is extremely unexpected. There has been a long-standing prejudice in the art that polyurethane foam material is absolutely unusable for manufacturing substantially thin articles having a large surface area, since voids and holes in such articles cannot avoided. This material has been used for manufacturing only thick articles such as, for instance, mattresses, ski boots, seat cushions and the like.

In accordance with the present invention, components of the polyurethane foam material are supplied from containers and mixed with each other to form a predetermined quantity of polyurethane foam mixture; the mixture is then admitted into the deepest portion of a form member of a mold and an insert member is inserted into the form member so that the material is distributed over a space formed therebetween and a surplus material flows through a gap provided at a circumferential portion of the mold. The thus formed bathing cap is removed from the mold, and the surplus material separated from the main part, that is from the bathing cap itself.

The above method of manufacture of the bathing cap may be fully automatic, can be carried out in the shortest time and excludes any necessity of a subsequent treatment. It is less time-consuming, labor-consuming and energy-consuming than the prior art, does not require expensive equipment, and therefore the method is less expensive than the conventional methods of manufacturing bathing caps. At the same time, the novel method requires material which is cheaper than the materials used in the known methods. On the other hand, the thus manufactured cap maintains its characteristics under the action of stronger deleterious factors as compared with the known bathing caps. It does not change its characteristics such as its shape and color under the action of high temperatures equal to, for instance, 80° C. existing in a display window, and under the action of intensive light.

The elasticity of the bathing cap is easily controlled by selection of the initial components of the polyurethane foam material, by the content of a mixture of such components, by the temperature of the mold, by the pressure of foaming process, and by the thickness of a wall of the bathing cap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
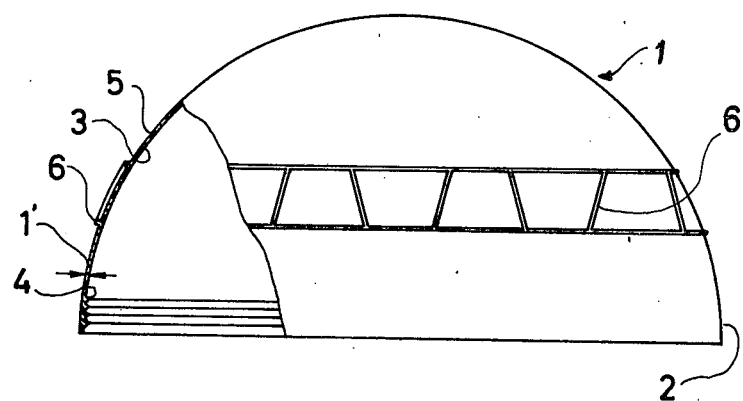
FIG. 1 is a partially sectioned side view of a bathing cap according to the present invention.

As clearly shown in FIG. 1, a bathing cap according to the present invention comprises a body part of polyurethane foam material, identified in toto by reference numeral 1. The body part 1 has an intermediate portion 1' which has a thickness between substantially 0.1 mm and 0.8 mm, preferably about 0.4 mm. The body part also comprises an open marginal edge portion 2 provided with circular ribs 4 on the inner face surface 3 thereof. The outer face surface 5 of the body part 1 of the bathing cap is structured, and such structures are formed by projections 6 outwardly projecting beyond the outer face surface 5, so that the body part has a differing wall thickness at different locations.

The body part 1 of the bathing cap has been mentioned before as being of polyurethane foam material. The latter includes a polyalcohol component, such as, for instance, polyester polyol. Chain molecules of the material are cross-linked. The layers of the material which are adjacent the outer face surface 5 and the inner face surface 3 of the body part 1 have closed cells, i.e., the cells forming during the foaming become collapsed at these surfaces (in known manner) and make these surfaces water-impervious.

Figure 2:
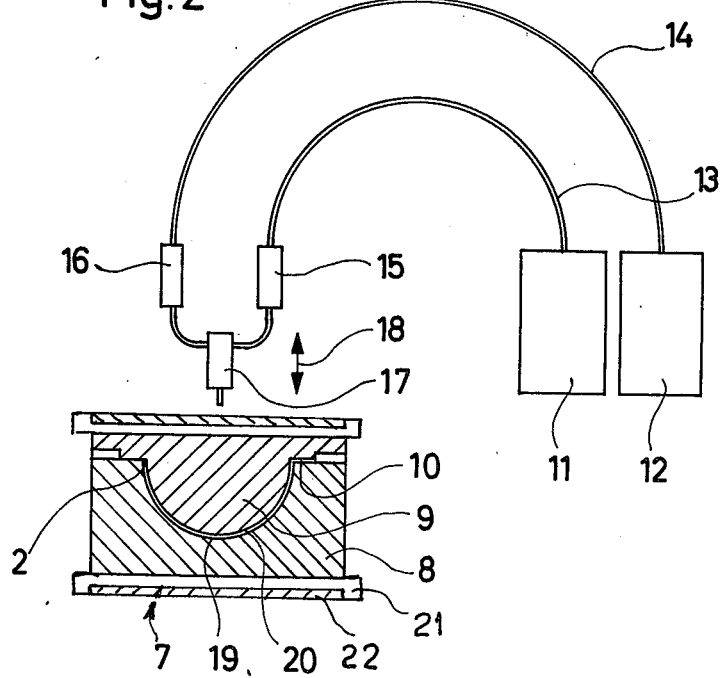
FIG. 2 is a schematic view of an arrangement for manufacturing a bathing cap of the present invention.

FIG. 2 shows an arrangement for manufacturing the bathing cap of the invention, which arrangement comprises a mold 7 formed by a cap-shaped form member 8 and an insert member 9 substantially corresponding in form to the cavity of the form member 8. That inner cavity surface of the form member 8 which faces toward the insert member 9 conforms with the outer face surface 5 of the body part 1 of the bathing cap, whereas the surface of the insert member 9 which faces the inner cavity surface of the form member 8 conforms with the inner face surface 3 of the body part 1 of the bathing cap. The form part 8 and the insert part 9, on the one hand, can be separated from each other, and, on the other hand, can be fixedly connected with each other so that in the latter case a space 20 is provided therebetween for forming the bathing cap in this space, and a gap 10 is provided adjacent the marginal edge portion 2 of the bathing cap. The thus connected members 8 and 9 together form a mold 7, the cavity of which latter is accessible through the gap 10. Containers 11 and 12 are provided and are connected by means of respective conduits 13 and 14 with metering pumps 15 and 16. The latter are connected with a mixing device 17, which is movable in the direction of the double arrow 18, that is towards and away from the mold 7. Reference numeral 19 identifies the deepest portions of the mold cavity in the form part 8.

The mold is provided with supporting elements 21, and heating plates 22 mounted on the supporting elements 21. The heating plates 22 are connected with a source of heat which is known per se, e.g., electricity in case of resistance heating, and which therefore is not shown in the drawing. The arrangement is also provided with a device for separating a surplus material from a main part of the cap, which device is also known per se and not shown in the drawing. The preferred separating device, is, for instance, a Lining Trimming Machine, Type GP 5 or GP 6, manufactured by Officina Meccanica COLLI F.G.B. (Italy).

The bathing cap of the invention is manufactured in the following manner.

The components of the polyethylene foam material are supplied from the containers 11 and 12 through the conduits 13 and 14 and metering pumps 15 and 16 to the mixing device 17, in which latter a predetermined quantity of a mixture of the polyurethane foam material is prepared. The mixing device 17 is moved towards the foam member 8 of the mold 7 and supplies the predetermined quantity of the mixture into the deepest portion 19 of the form member 8. Then, the insert member 9 is inserted into the form member 8 and is fixedly connected to the latter. In this case, the material fills the inner space 20 between the form member 8 and the insert member 9, and the surplus portion of the material flows out through the gap 10. The dimension of the gap 10 affects the magnitude of pressure exerted during the process of foaming. The form member 8 and/or the insert member 9 are heated by means of heating plates 22 to a temperature between 40° C. and 60° C. The above heating prevents forming of voids and holes, and accelerates the process of cross-linking of molecules of the material. The initial components of the polyurethane foam material may be heated to a temperature between 20° C. and 50° C. For foaming the polyurethane foam material preferably a low pressure is used such as, for instance, equal to between 10 bar and 40 bar. It is also possible to use a high pressure, such as, for instance, equal to between 150 bar and 300 bar.

It is advantageous to add to the components of the polyurethane foam material a solvent substance adapted to swell the material. The provision of such solvent substance is especially desirable in the case when the bathing cap has portions of different thicknesses. In this case the solvent substance swells the material in the region forming the portions of greater thickness so that a portion of the material is conveyed to the regions forming the portions of smaller thickness. Such solvent substance may be selected from the group consisting of methylene chloride and low-boiling halogen alkane, such as for instance, monofluorotrichloromethane or trichlorotrifluoroethane.

The polyurethane foam material confined in the space 20 between the form member 8 and the insert member 9 forms the bathing cap. The form member 8 and the insert member 9 are separated from one another, and the thus formed bathing cap are removed from the mold 7. Then, the surplus portion of the material substantially surrounding the main portion of the bathing cap is separated from the latter.

It will be understood that each of the elements described above, or two or more together, may also find a useful application in other types of constructions and methods differing from the types described above.

While the invention has been illustrated and described as embodied in a bathing cap, and a method and arrangement for manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A bathing cap, comprising an elastic body part composed substantially of a polyurethane foam material which includes a polyalcohol component consisting of polyester polyol, said body part having two spaced face surfaces defining a wall of said cap therebetween and two surface layers each adjacent a respective one of said face surfaces, said wall of said body part having a thickness which is substantially less than 1 mm, and said surface layers of said wall having closed cells.

2. The bathing cap as defined in claim 1, wherein said material has chain molecules which are cross-linked.

3. The bathing cap as defined in claim 1, wherein said body part has an outer face surface provided with at least one structured formation.

4. The bathing cap as defined in claim 3, wherein said body part has a wall comprising at least one portion of a thickness other than the thickness of the remainder of said wall, said one portion of said wall of said body part forming said structured formation of said outer surface thereof.

5. The bathing cap as defined in claim 1, wherein the thickness of said wall of said body part is substantially equal to between 0.1 mm and 0.8 mm.

6. The bathing cap as defined in claim 5, the thickness of said wall of said body part is substantially equal to 0.4 mm.

* * * * *